Patented Sept. 30, 1952

2,611,945

UNITED STATES PATENT OFFICE 2,611,945

METHOD OF RUSTPROOFING IRON AND STEEL REINFORCING ELEMENTS FOR STEAM CURED CONCRETE

Lennart Hans Simonsson, Stockholm, and Leo Torsten Ulfstedt, Sodertalje, Sweden, assignors to Internationella Siporex Aktiebolaget, Stockholm, Sweden, a company of Sweden No Drawing. Application September 11, 1950, Serial No. 184,342. In Sweden September 15, 1949

12 Claims. (Cl. 25—154)

This invention relates to the manufacture of rust-proofed reinforcing elements of iron and steel for steam-cured concrete, particularly steam-cured light-weight concrete.

One of the major problems connected with the use of reinforced concrete is the rusting of the reinforcing elements with consequent weakening of the structure. This rusting results from moisture and air coming in contact with the reinforcing elements through the joints between the reinforcing elements and the surrounding concrete.

In our copending application, Serial No. 57,824, filed November 1, 1948, we have proposed to obviate said difficulties by providing a rust-inhibitive coating on the metal reinforcing elements by means of a liquid slurry of a hydraulic cement containing a small proportion of a hydrophilic organic colloidal binding material which at least swells in water in amount sufficient to render the coating flexible and to produce a binding action in the coating, and drying the coating before the setting of the cement has taken place, whereby the coating remains reactive with water and unites with concrete in which the coated reinforcing elements are then embedded.

The present invention now relates to a modification of said process applicable in case of producing steam-cured concrete products, especially steam-cured light-weight concrete.

According to the invention, the hydraulic cement of our above mentioned coating composition is replaced by a mixture of finely ground lime and a reactive siliceous material. Consequently, according to the process of the present application, the iron or steel reinforcing elements are coated with a liquid slurry of a mixture of lime and siliceous material containing a small proportion of a hydrophilic organic colloidal binding material which at least swells in water in an amount sufficient to render the coating flexible and tough and to produce a binding action in the coating, and the coating thus applied is then dried as described above, preferably by the application of heated air. The so-coated reinforcing elements are embedded in concrete which is subjected to a curing by steam in a manner known per se, preferably in autoclaves at an over-pressure of 8–12 kgs., and in said steam-curing operation the lime and siliceous components of the coating react to form calcium silicates producing a tight water-proof joint between the reinforcing elements and the concrete. In this manner a cheap and convenient way has been found to produce a satisfactory rust-inhibitive coating on the reinforcing elements.

As siliceous components of our coating composition we may use finely ground sand, especially quartz sand, shale ash, fly ash, ground stone, burnt or unburnt clay. The proportions of lime and siliceous materials in the mixture may vary within the ranges of 60–20% by weight of lime and 40–80% by weight of siliceous material.

Among the materials which we have found suitable for the hydrophilic organic colloidal binding agent in the practice of our invention may be mentioned proteineous substances, such as casein, bone glue and others, further carbohydrates, such as dextrin, and cellulose derivatives, for example methyl cellulose and other esters or ethers of cellulose which are hydrophilic and which swell in water. The quantity of the binding agent used may be within the limits 2–20%, calculated on the weight of the mixture of lime and siliceous materials, in case of casein preferably 5–10%.

According to a modification of the invention the protective effect of the coating may be further improved by the addition of an alkali metal chromate, such as sodium chromate or bichromate, suitably in a quantity of 01–10%, based on the weight of the mixture of lime and siliceous materials.

As indicated above, the invention is especially intended to be applied for the production of rust-inhibitive coatings on reinforcing elements in connection with the manufacture of reinforced steam-cured light-weight concrete products which are produced according to the methods known per se.

As specific examples of the composition of our liquid coating composition, the following may be mentioned:

Example 1

| | Parts |
|---|---|
| Slaked lime | 30 |
| Quartz sand, finely ground | 70 |
| Casein | 5 |
| Water | 45 |

Example 2

| | Parts |
|---|---|
| Slaked, hydraulic lime | 25 |
| Fly ash | 75 |
| Bone glue | 8 |
| Sodium chromate | 2 |
| Water | 50 |

Example 3

| | Parts |
|---|---|
| Slaked lime | 20 |
| Quartz-feldspar sand, finely ground | 80 |
| Casein | 5 |
| Water | 40 |

Example 4

| | Parts |
|---|---|
| Slaked lime | 35 |
| Shale ash or burnt clay, finely ground | 65 |
| Methyl cellulose | 15 |
| Water | 60 |

Example 5

| | Parts |
|---|---|
| Slaked lime | 25 |
| Quartz sand, finely ground | 50 |
| Unburnt clay, finely ground | 25 |
| Casein | 5 |
| Sodium bichromate | 5 |
| Water | 45 |

When preparing the coating compositions according to the above mentioned examples, the lime and the siliceous materials and the bulk of the water are preferably first mixed together, and the binding agent is then added dissolved in the remaining water. In case of using the preferred binding material, casein, the casein may suitably be dissolved in water in the presence of a small quantity of the lime which facilitates the dissolution. If a chromate is used, this is preferably added to the solution of the binding material before the addition of the latter to the slurry of lime and siliceous materials.

The application of the slurry coating on the reinforcing elements may be effected in any suitable manner, for example by dipping, brushing, spraying or other methods. The drying of the coating is suitably accelerated by the application of heated air, for example by exposing the coated elements to a current of air heated to a temperature of 30° for a sufficient time.

The coated reinforcing elements thus obtained are embedded in concrete, preferably light-weight concrete, which is subjected to a steam-curing in autoclaves, as known per se, preferably at an overpressure of 8–12 kgs., and hereby the reactions take place by means of which the coating is converted to a tight water-proof bond between the reinforcing elements and the concrete.

Although the invention above has been described with reference to reinforcing elements of iron and steel, our coatings are also suitable for the treatment of other types of metal reinforcing elements liable to rusting.

Further, while various embodiments of our invention have been hereinabove indicated, it will be understood that the invention of this application is not limited to the specific examples herein recited but that numerous modifications and variations thereof may be made without departing from the principles of our invention.

We claim:

1. The method of rust-proofing iron and steel reinforcing elements for steam-cured concrete, which comprises coating such elements with a liquid aqueous slurry of a finely ground mixture of lime and a reactive siliceous material containing a small proportion of a hydrophilic organic colloidal binding material which at least swells in water in an amount sufficient to render the coating flexible and tough and to produce a binding action in the coating, drying the coating thus applied before it has had time to set, surrounding the so-coated reinforcing elements with a concrete grout, and subjecting the whole to a curing by steam, whereby the lime and siliceous components of the coating react with each other and set producing a tight waterproof joint between the reinforcing elements and the concrete.

2. The process of claim 1 wherein the mixture of lime and siliceous material in the coating composition contains about 60–20% by weight of lime to 40–80% of siliceous material.

3. The process of claim 1 wherein the hydrophilic organic colloidal binding material is added to the composition in a quantity of about 2–20%, calculated on the weight of the mixture of lime and siliceous material.

4. The process of claim 1 wherein the hydrophilic organic colloidal binding material is a proteineous substance.

5. The process of claim 1 wherein the hydrophilic organic colloidal binding material is a carbohydrate.

6. The process of claim 1 wherein the hydrophilic organic colloidal binding material is a water-soluble cellulose derivative.

7. The process of claim 1 wherein the hydrophilic organic colloidal binding material is casein.

8. The process of claim 1 wherein the coating composition contains a small amount of a dissolved alkali metal chromate as a rust-proofing agent.

9. The process of claim 1 wherein the coating applied on the reinforcing elements is dried by the application of heated air.

10. The process of claim 1 wherein the concrete is a light-weight concrete.

11. In the making of reinforced steam-cured concrete wherein rust-proofed iron and steel reinforcing elements are employed, the process which comprises coating the reinforcing elements with an aqueous slurry of a finely ground mixture containing about 60–20% by weight of lime and 40–80% by weight of a reactive siliceous material and a small proportion of casein sufficient to render the coating tough and to produce a binding action in the coating, drying the coating thus applied before it has had time to set, embedding the so-coated reinforcing elements in a concrete grout and subjecting the whole to a curing by steam, whereby in the steam-curing operation the lime reacts with the siliceous material producing cured water-tight joints between the reinforcing elements and the concrete.

12. In the making of reinforced steam-cured concrete wherein rust-proofed iron and steel reinforcing elements are employed, the process which comprises coating the reinforcing elements with an aqueous slurry of a finely ground mixture containing about 60–20% by weight of lime, 40–80% by weight of a reactive siliceous material and about 2–20% of casein, calculated on the weight of the mixture of lime and siliceous material, and sufficient sodium chromate to act as a rust-inhibitor, drying the coating thus applied, embedding the so-coated reinforcing elements in a concrete grout and subjecting the whole to a curing by steam, whereby in the steam-curing operation the lime reacts with the siliceous material producing cured water-tight joints between the reinforcing elements and the concrete.

LENNART HANS SIMONSSON.
LEO TORSTEN ULFSTEDT.

REFERENCES CITED

The following references are of record in the file of this patent:

UNITED STATES PATENTS

| Number | Name | Date |
|---|---|---|
| 2,105,324 | Huttemann | Jan. 11, 1938 |